US007655137B2

(12) United States Patent
Zhou et al.

(10) Patent No.: US 7,655,137 B2
(45) **Date of Patent: *Feb. 2, 2010**

(54) REFORMING CATALYSTS HAVING A CONTROLLED COORDINATION STRUCTURE AND METHODS FOR PREPARING SUCH COMPOSITIONS

(75) Inventors: Bing Zhou, Cranbury, NJ (US); Horacio Trevino, Annandale, NJ (US); Zhihua Wu, Lawrenceville, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/435,165

(22) Filed: May 16, 2006

(65) Prior Publication Data

US 2006/0243641 A1 Nov. 2, 2006

Related U.S. Application Data

(63) Continuation-in-part of application No. 11/101,241, filed on Apr. 7, 2005, now Pat. No. 7,569,508.

(60) Provisional application No. 60/643,836, filed on Jan. 14, 2005.

(51) Int. Cl.
*C10G 35/09* (2006.01)
*B01J 31/02* (2006.01)
*B01J 23/42* (2006.01)
*B01J 23/58* (2006.01)
*B01J 23/62* (2006.01)

(52) U.S. Cl. ....................... 208/134; 208/135; 502/150; 502/327; 502/328; 502/332; 502/334; 502/349; 502/350; 502/351; 502/352; 502/355

(58) Field of Classification Search ................ 208/134, 208/135; 502/150, 327, 328, 332, 334, 349, 502/350, 351, 352, 355
See application file for complete search history.

(56) References Cited

U.S. PATENT DOCUMENTS 3,625,879 A 12/1971 Horne et al. ................ 427/541
3,644,200 A 2/1972 Young ................... 208/120.15
3,674,706 A 7/1972 Box, Jr., et al.
3,686,340 A 8/1972 Patrick et al. ............... 585/485
3,700,745 A 10/1972 Kovach et al. .............. 585/485
4,007,256 A 2/1977 Kim et al.
4,028,274 A 6/1977 Kunz .......................... 502/184
4,053,531 A 10/1977 Kerr et al. ................... 585/476
4,064,154 A 12/1977 Chandra et al. ............. 556/410
4,073,865 A * 2/1978 Flanigen et al. ............... 502/60
4,083,803 A 4/1978 Oswald et al.
4,128,627 A 12/1978 Dyer et al.
4,148,750 A 4/1979 Pine ............................ 502/26
4,157,355 A 6/1979 Addison ..................... 585/321
4,247,730 A 1/1981 Brunelle ..................... 585/489
4,279,883 A 7/1981 Izumi et al. ................. 423/584
4,297,205 A 10/1981 Mieville
4,335,092 A 6/1982 Dalton, Jr. et al.
4,336,239 A 6/1982 Dalton, Jr. et al.
4,336,240 A 6/1982 Moseley et al.
4,347,231 A 8/1982 Michaelson ................. 423/584
4,347,232 A 8/1982 Michaelson ................. 423/584
4,366,085 A 12/1982 Ikegami et al. .............. 502/155
4,379,778 A 4/1983 Dalton, Jr. et al. .......... 423/584
4,454,240 A 6/1984 Ganguli
4,476,242 A 10/1984 Puskas et al. ............... 502/185
4,503,160 A 3/1985 Williams, Jr.
4,513,098 A 4/1985 Tsao .......................... 502/216
4,595,666 A 6/1986 Ganguli
4,701,428 A 10/1987 Bellussi et al.
4,713,363 A 12/1987 Hucul ........................ 502/262
4,793,980 A * 12/1988 Torobin ...................... 502/180
4,824,976 A 4/1989 Clerici et al.
4,826,795 A 5/1989 Kitson et al. ................ 502/184
4,832,821 A * 5/1989 Swan, III ..................... 208/65
4,832,938 A 5/1989 Gosser ....................... 423/584
4,937,216 A 6/1990 Clerici et al.
4,937,220 A 6/1990 Nickols, Jr. ................. 502/185
4,983,558 A 1/1991 Born et al.
4,999,326 A 3/1991 Sikkenga et al.
5,017,535 A 5/1991 Schoonhoven et al.
5,024,905 A 6/1991 Itoh et al. ..................... 429/44
5,061,671 A 10/1991 Kitson et al. ................ 502/185
5,096,866 A 3/1992 Itoh et al. ................... 502/101
5,104,635 A 4/1992 Kanada et al.

(Continued)

FOREIGN PATENT DOCUMENTS

EP O 864 362 9/1998

(Continued)

OTHER PUBLICATIONS

Scott, et al., "Interaction between ruthenium and molybdenum in $RuMo/Al_2O_3$ catalysts", *Applied Catalysts A: General* 125 (1995) 71-79.

(Continued)

*Primary Examiner*—Glenn Caldarola
*Assistant Examiner*—Randy Boyer
(74) *Attorney, Agent, or Firm*—Workman Nydegger

(57) ABSTRACT

The reforming catalysts include a halogen promoter and a plurality of nanocatalyst particles supported on a support material. The nanocatalyst particles have a controlled crystal face exposure of predominately (110). The controlled coordination structure is manufactured by reacting a plurality of catalyst atoms with a control agent such as polyacrylic acid and causing or allowing the catalyst atoms to form nanocatalyst particles. The catalysts are used in a reforming reaction to improve the octane number of gasoline feedstock. The reforming catalysts show improved $C_{5+}$ hydrocarbon production and improved octane barrel number increases as compared to commercially available reforming catalysts.

28 Claims, No Drawings

U.S. PATENT DOCUMENTS 5,128,114 A 7/1992 Schwartz .................... 423/335
5,132,099 A 7/1992 Hiramatsu et al. .......... 423/584
5,132,480 A 7/1992 Tsutsui et al. ............... 585/489
5,166,372 A 11/1992 Crocco et al.
5,180,573 A 1/1993 Hiramatsu et al. .......... 423/584
5,188,996 A 2/1993 Huang et al.
5,214,168 A 5/1993 Zajacek et al.
5,234,584 A 8/1993 Birbara et al.
5,236,692 A 8/1993 Nagashima ................. 423/584
5,320,821 A 6/1994 Nagashima et al. ......... 423/584
5,338,531 A 8/1994 Chuang et al. .............. 423/584
5,352,645 A 10/1994 Schwartz .................... 502/262
5,372,981 A 12/1994 Witherspoon ............... 502/155
5,378,450 A 1/1995 Tomita et al. ............... 423/584
5,391,531 A 2/1995 Ward .......................... 502/208
5,399,344 A 3/1995 Yang et al.
5,480,629 A 1/1996 Thompson et al. .......... 423/584
5,496,532 A 3/1996 Monzen et al. ............. 423/584
5,505,921 A 4/1996 Luckoff et al.
5,583,085 A 12/1996 Ward
5,698,488 A 12/1997 Birbara et al. .............. 502/325
5,767,036 A 6/1998 Freund et al. ............... 502/185
5,846,895 A 12/1998 Gila et al.
5,846,898 A 12/1998 Chuang et al. .............. 502/181
5,851,948 A 12/1998 Chuang et al. .............. 502/314
5,859,265 A 1/1999 Muller et al. ............... 549/531
5,866,500 A 2/1999 Taguchi et al.
5,885,443 A 3/1999 Bogdan et al.
5,900,386 A 5/1999 Freund et al. ............... 502/330
5,912,367 A 6/1999 Chang
5,925,588 A 7/1999 Chuang et al. .............. 502/181
5,961,948 A 10/1999 Wanngard ................... 423/584
5,965,101 A 10/1999 Goto et al.
5,972,305 A 10/1999 Park et al. ................... 423/587
5,976,486 A 11/1999 Thompson et al. .......... 423/584
6,001,762 A 12/1999 Harmer et al.
6,005,155 A 12/1999 Sun
6,040,490 A 3/2000 Ichioka et al. .............. 585/475
6,054,507 A 4/2000 Funaki et al. ............... 523/210
6,069,286 A 5/2000 Wu et al. .................... 585/485
6,090,858 A 7/2000 El-Sayed ..................... 516/97
6,106,797 A 8/2000 Muller et al. ............... 423/584
6,127,307 A * 10/2000 Muller et al. ............... 502/162
6,159,267 A 12/2000 Hampden-Smith et al. ..... 75/252
6,168,775 B1 1/2001 Zhou et al. .................. 423/584
6,194,338 B1 2/2001 Andolfatto et al. .......... 502/101
6,239,054 B1 5/2001 Shukis et al.
6,284,213 B1 9/2001 Paparatto et al. ............ 423/403
6,331,500 B1 12/2001 Tsuji et al.
6,387,346 B1 5/2002 Bertsch-Frank et al. ...... 423/584
6,447,743 B1 9/2002 Devic et al.
6,500,968 B2 12/2002 Zhou et al. .................. 549/531
6,500,969 B1 12/2002 Zhou et al. .................. 549/531
6,518,217 B2 2/2003 Xing et al. .................. 502/230
6,528,683 B1 3/2003 Heidemann et al. .......... 562/542
6,534,440 B2 3/2003 Choudhary et al. .......... 502/333
6,534,661 B1 * 3/2003 Zhou et al. ..................... 502/77
6,551,960 B1 4/2003 Laine et al. ................. 502/327
6,576,214 B2 6/2003 Zhou et al. .................. 423/584
6,630,118 B2 10/2003 Paparatto et al. ............ 423/584
6,635,348 B1 10/2003 Hampden-Smith et al.
6,649,140 B2 11/2003 Paparatto et al. ............ 423/584
6,676,919 B1 1/2004 Fischer et al. ............... 423/584
6,713,036 B1 3/2004 Vanden Bussche et al. .. 423/584
6,727,309 B1 4/2004 Paiva et al.
6,740,615 B2 5/2004 Zhou ........................... 502/29
6,746,597 B2 * 6/2004 Zhou et al. .................. 208/138
6,776,606 B2 8/2004 Haskew ......................... 431/2
6,782,892 B2 8/2004 Li et al. ...................... 131/364
6,888,013 B2 5/2005 Paparatto et al. ............ 549/532
7,011,807 B2 * 3/2006 Zhou et al. .................. 502/155
7,045,479 B2 5/2006 Zhou et al.
7,045,481 B1 5/2006 Parasher et al.
2001/0024634 A1 9/2001 Bertsch-Frank et al. ..... 423/584
2002/0022672 A1 2/2002 Thunhorst et al.
2003/0010252 A1 1/2003 Arita et al.
2003/0012686 A1 1/2003 Andresen et al.
2003/0086853 A1 5/2003 Devic ......................... 423/272
2003/0104936 A1 6/2003 Mao et al.
2003/0121364 A1 7/2003 Sun
2003/0215383 A1 11/2003 Escrig et al. ................ 423/584
2004/0013601 A1 1/2004 Butz et al. .................. 423/584
2004/0037769 A1 2/2004 Paparatto et al. ............ 423/584
2004/0037770 A1 2/2004 Fischer et al. ............... 423/584
2004/0081611 A1 4/2004 Muller et al. ............... 423/584
2004/0087441 A1 5/2004 Bock et al.
2004/0102648 A1 5/2004 Borgmeier et al.
2004/0151659 A1 8/2004 Paparatto et al. ............ 423/584
2004/0151660 A1 8/2004 Paparatto et al. ............ 423/584
2004/0184983 A1 9/2004 Paparatto et al. ............ 423/584
2004/0241502 A1 12/2004 Chung
2005/0014636 A1 1/2005 Zhou et al. .................. 502/159
2006/0102521 A1 5/2006 Zhou et al.
2006/0243641 A1 11/2006 Zhou et al.
2008/0045401 A1 2/2008 Zhou et al.

FOREIGN PATENT DOCUMENTS

EP 0 978 316 2/2000
EP 1 277 701 7/2002
EP 1 344 747 9/2003
JP 07069605 3/1995
JP 10324507 12/1998
JP 03024794 1/2003
WO WO 98/10863 3/1998
WO WO 00/59635 10/2000
WO WO 01/05501 1/2001
WO WO 02/14217 2/2002
WO WO 02/083305 10/2002
WO WO 02/092501 11/2002
WO WO 02/092502 11/2002
WO WO 03/014014 2/2003
WO WO 2006/078352 7/2006

OTHER PUBLICATIONS

Adesina, "Hydrocarbon synthesis via Fischer-Tropsch reaction: travails and triumphs", *Applied Catalysts A: General* 138 (1996) 345-367.

Aksoylu, et al., "Interaction between Nickel and Molybdenum in Ni-Mo/$Al_2O_3$ catalysts: II CO Hydrogenation", *Applied Catalysts A: General* 168 (1998) 399-407.

Aksoylu, et al., "Interaction between nickel and molybdenum in Ni-Mo/$Al_2O_3$ catalysts: III. Effect of impregnation strategy", *Applied Catalysts A: General* 183 (1999) 357-364.

Zhu, et al., "Catalytic partial oxidation of methane to synthesis gas over Ni-$CeO_2$", *Applied Catalysts A: General* 208 (2001) 403-417.

Morioka, et al., "Partial oxidation of methane to synthesis gas over supported Ni catalysts prepared from Ni-Ca/Al-layered double hydroxide", *Applied Catalysts A: General* 215 (2001) 11-19.

Chu, et al., "The partial oxidation of methane to syngas over the nickel-modified hexaaluminate catalysts $BaNi_{\gamma}Al_{12-\gamma}O_{19-\delta}$", *Applied Catalysts A: General* 235 (2002) 39-45.

Basile, et al., "Rh-Ni synergy in the catalytic partial oxidation of methane: surface phenomena and catalyst stability", *Catalysis Today* 77 (2002) 215-223.

Te, et al., "Comparative study of Rh/$Al_2O_3$ and Rh-Mo/$Al_2O_3$ catalysts", *Center for Catalytic Science and Technology*, Abstract, Oct. 4, 1994.

Lowenthal, et al., "Surface Chemistry of Rh-Mo/γ-$Al_2O_3$: An Analysis of Surface Acidity," *Journal of Catalysis* 156, 96-105 (1995).

"Shape-Controlled Synthesis of Colloidal Platinum Nanoparticles" by T. Ahmadi, et al., Science, vol. 272, Jun. 28, 1996, pp. 1924-1926.

Nashner et al., "Structural Characterization of Carbon-Supported Platinum-Ruthenium Nanoparticles from the Molecular Cluster Precursor $PtRu_5C(CO)_{16}$", Journal of the American Chemical Society, 1997, 119, 7760-7771.
Sun et al., "Monodisperse FePt Nanoparticles and Ferromagnetic FePt Nanycrystal Superlattices", Mar. 17, 2000, Science, vol. 287, pp. 1989-1992.
Bonnemann et al., "Nanoscale colloidal metals and alloys stabilized by solvents and surfactants Preparation and use as catalyst precursors", Journal of Organometallic Chemistry 520 (1996), 143-162.
Kim et al., "Preparation and characterization of Au-Ag and Au-Cu alloy nanoparticles in chloroform", Journal of Materials Chemistry, 2003, 13, 1789-1792.
Li et al., "Carbon Nanotubes as Support for Cathode Catalyst of a Direct Methanol Fuel Cell", Letters to the Editor/Carbon 40, Dalian University of Technology, pp. 787-803 (Jan. 18, 2002).
Li et al., "Preparation and Characterization of Multi-Walled Carbon Nanotube-Supported Platinum for Cathode Catalysts of Direct Methanol Fuel Cells", J. Phys. Chem., B, vol. 107, pp. 6292-6299 (Jun. 6, 2003).
Lordi et al., "Method for Supporting Platinum on Single-Walled Carbon Nanotubes for a Selective Hydrogenation Catalyst", Chem. Mater., vol. 13, pp. 733-737 (Feb. 10, 2001).
Zhou et al., "Novel Synthesis of Highly Active Pt/C Cathode Electrocatalyst for Direct Methanol Fuel Cell", Chem. Commun. 2003, pp. 394-395.
Zhou et al., "Preparation and Characterization of anode catalysts Pt/Ru/C for Direct Methanol Fuel Cells", Chemical Journal of Chinese Universities, vol. 24, 2003, pp. 858-862.
Office Action dated Mar. 27, 2008 cited in U.S. Appl. No. 10/990,616.
Office Action dated Jul. 18, 2008 cited in U.S. Appl. No. 10/990,616.
Office Action dated Mar. 27, 2008 cited in U.S. Appl. No. 11/103,676.
Office Action dated Aug. 13, 2008 cited in U.S. Appl. No. 11/103,676.
Office Action dated Aug. 21, 2008 cited in U.S. Appl. No. 11/101,241.
Office Action dated Aug. 19, 2008 cited in U.S. Appl. No. 11/101,241.
Office Action dated Jun. 24, 2008 cited in U.S. Appl. No. 11/435,580.
Search Report from PCT/US05/42841.
Office Action dated Dec. 17, 2008 cited in U.S. Appl. No. 10/990,616.
Office Action dated Dec. 5, 2008 cited in U.S. Appl. No. 11/103,676.
Office Action dated Jan. 9, 2009 cited in U.S. Appl. No. 11/101,241.
Notice of Allowance dated Apr. 10, 2009 in U.S. Appl. No. 11/101,241.
Notice of Allowance dated Jan. 30, 2009 in U.S. Appl. No. 11/435,580.

* cited by examiner

REFORMING CATALYSTS HAVING A CONTROLLED COORDINATION STRUCTURE AND METHODS FOR PREPARING SUCH COMPOSITIONS

CROSS-REFERENCE TO RELATED APPLICATIONS

This application is a continuation-in-part of U.S. application Ser. No. 11/101,241, filed Apr. 7, 2005, which claims the benefit of earlier filed U.S. Provisional Application No. 60/643,836, filed Jan. 14, 2005.

BACKGROUND OF THE INVENTION

1. The Field of the Invention

The present invention relates to catalysts for use in reforming hydrocarbons. More particularly, the invention relates to reforming catalysts having a controlled coordination structure and methods for manufacturing such catalysts and reforming hydrocarbons.

2. The Relevant Technology

Naphtha is a volatile, flammable liquid mixture of hydrocarbons distilled from petroleum or other fossil fuel sources. Naphtha can be used as a fuel, a solvent, or in making various chemicals. Typically naphtha is a mixture of hydrocarbons that boil between about 65° C. and about 195° C. and is obtained by processing crude oil and optionally heavy oil fractions.

Naphtha reforming is an important refinery process where naphtha is upgraded into more valuable hydrocarbons having a higher octane rating. In reforming, naphtha is heated and fed into a series of reactors loaded with a solid supported metal catalyst. Typically, the catalyst contains platinum and one or more additional metals, which are supported on alumina.

The main goal of the reforming process is to convert the feed into a liquid product stream with a higher octane number. The octane number is a measure of the performance of the hydrocarbons in a gasoline internal combustion engine. Thus, naphtha reforming converts hydrocarbons streams into a reformate product that is more suitable as a gasoline blending stock. The octane number gain during the reforming process varies depending on, among other factors, the original crude and the reforming conditions. Typical octane value increases are in a range between 30 and 70.

The reforming process involves various parallel and consecutive reactions. The reforming process improves octane by increasing the percentage of branched and/or aromatic compounds in the reformate. In addition to the production of gasoline blending stocks, reforming is a very significant source of aromatics (e.g., benzene, toluene, and xylenes, collectively known as BTX), which are used extensively in the chemical and petrochemical industries (e.g., as solvent or starting materials). The reforming process is also the only refinery operation that yields a net production of hydrogen. Hydrogen is extremely valuable because it finds extensive use elsewhere in a refinery, particularly for the upgrading of low quality hydrocarbon streams.

Among the multiple reactions taking place during the reforming operation, some of them are undesirable, at least to some extent. One of these reactions is hydrocracking, which occurs when a hydrocarbon chain is broken apart into two smaller molecules with a net consumption of hydrogen. Hydrocracking in the reforming process can be undesirable because it consumes valuable hydrogen and can produce smaller hydrocarbon fragments outside the range of liquid reformate product ($C_{5+}$ hydrocarbons). Light gases ($C_1$-$C_4$ hydrocarbons) formed by hydrocracking are not a desired reformate product. Production of $C_1$-$C_4$ hydrocarbons during reforming is considered a loss that reduces the overall yield of the reforming process.

While reforming catalysts are essential to improving octane number, reforming catalysts are also known to catalyze hydrocracking. The catalytic properties of a catalyst are determined by both the type of active components selected, i.e., the elemental composition of the catalyst, and the detailed structure of the dispersed particles, i.e., the atomic scale structure and orientation of the dispersed particles.

Historically, much of the work in the development and optimization of catalysts in general has focused on the selection of the appropriate catalytic components. Prior methods have allowed catalyst developers to control the selection and relative amounts of catalyst components. However, the control of the detailed structure of catalysts, particularly on the atomic scale, has presented a much greater difficulty. However, controlling the atomic scale structure can be as important in the development of effective catalysts as selecting the elemental composition. For example, control of the detailed catalyst crystal structure can relate directly to the selectivity of the catalyst for a particular reaction.

One particularly useful way of defining a preferred catalytic structure is based on the geometry of the surface active sites. Because of thermodynamic considerations, it is normally the case that particles of crystalline materials will expose one or more of a limited number of low-index crystal faces. Common low-index crystal face exposures of metal particles include, for example, the 111, 100, and 110 crystal faces of the common crystal lattices, which include face-centered cubic (FCC), body-centered cubic (BCC), and hexagonal close-packed (HCP). Each of these crystal faces has a different arrangement of atoms, and may therefore display different catalytic properties with respect to certain chemical reactions.

BRIEF SUMMARY OF THE INVENTION

The present invention relates to reforming catalysts comprising dispersed nanocatalyst particles and a halogen promoter supported on a support material as well as methods for manufacturing such catalysts and reforming hydrocarbons. The nanocatalyst particles have a controlled crystal face exposure that is predominantly surface atoms with a nearest neighbor coordination number of 2, (e.g., (110)). The catalysts are used in the catalytic reforming of naphtha for octane number enhancement and/or for BTX formation. The reforming catalysts of the present invention have improved production of $C_{5+}$ hydrocarbons and reduced production of the less valuable $C_1$-$C_4$ hydrocarbons.

In an exemplary embodiment, methods for manufacturing the reforming catalysts of the present invent include: (i) providing a support material; (ii) providing a halogen promoter impregnated in the support; (iii) preparing a catalyst precursor by reacting together a plurality of catalyst atoms (e.g. platinum, palladium, rhodium, or iridium) and a straight-chained organic polymer or oligomer having functional groups capable of complexing the catalyst atoms (e.g. polyacrylic acid); (iv) allowing or causing the catalyst precursor to form nanocatalyst particles and supporting the nanocatalyst particles on the support material; and (v) removing at least a portion of the polymer or oligomer molecules to expose at least a portion of the catalyst atoms, thereby yielding a supported catalyst comprising a plurality of nanocatalyst particles in which at least about 50% of the catalyst atoms on an upper surface of the nanocatalyst particles have a nearest neighbor coordination number of 2 or a (110) crystal face exposure.

In a preferred embodiment, the reforming catalysts are multicomponent supported nanocatalysts. Multicomponent catalyst typically include platinum, palladium, rhodium, or iridium as a primary component and one or more of the following as a secondary catalyst component: tin, rhenium, germanium, lead, arsenic, antimony, tungsten, osmium, cadmium, indium, titanium, phosphorus, gallium, ruthenium, calcium, magnesium, barium, or strontium. The secondary catalyst component(s) can be selected to increase catalytic activity, promote other useful reactions, and/or help prevent catalyst deactivation by, e.g., coking.

The supported nanocatalyst particles of the present invention are advantageously very small. The methods of the present invention can produce nanocatalyst particles having a particle size less than about 100 nm, less than about 50 nm, or even smaller than about 5 nm. Providing catalyst particles sized in the nano range allows for highly active and highly efficient catalysts.

The reforming catalysts of the present invention are particularly useful in promoting reforming reactions with naphtha, such as for gasoline blending. Surprisingly, it has been found that catalyst with a crystal face exposure of the (110) type can improve the $C_{5+}$ hydrocarbon production in a reforming process as compared to catalyst having a crystal face exposure of (111). The improved $C_{5+}$ production is likely due to lower rates of hydrocracking, which causes formation of light hydrocarbon gases ($C_1$-$C_4$). It is believed that that (110) type catalyst structure has a lower rate of light gas formation because the catalyst provides a gap or separation between molecular hydrogen and hydrocarbons that have adsorbed onto the nanocatalyst particles. The catalysts of the present invention have been observed to increase octane barrel numbers by more than 5 units as compared to commercially available reforming catalysts.

These and other advantages and features of the present invention will become more fully apparent from the following description and appended claims as set forth hereinafter.

DETAILED DESCRIPTION OF EXEMPLARY EMBODIMENTS

I. Introduction and Definitions

The present invention is directed to the manufacture of novel reforming catalysts useful for reforming naphtha to enhance octane barrel number. According to one aspect of the invention, novel reforming nanocatalysts particles are manufactured in a manner so as to predominantly have a (110) type crystal face exposure on the surface. The nanocatalyst particles are supported on a support material and impregnated with a halogen promoter.

In an exemplary embodiment, an organic control agent is used that bonds to the catalyst atoms and determines, at least in part, the molecular arrangement of the catalyst atoms. These nanocatalyst particles can be used to form supported reforming catalysts with improved and/or selective catalytic activity and with increased longevity.

For purposes of disclosure and the appended claims, the term "nanoparticles" or "nano-sized particles," means particles with a diameter of less than about 100 nanometers (nm).

The term "catalyst precursor" refers to a solution, colloid or suspension in which a bond or coordination complex is formed between a control agent and one or more different types of catalyst atoms. The "bond" between the control agent and catalyst atoms may be ionic, covalent, electrostatic, or it may involve other bonding forces such as coordination with nonbonding electrons, Van Der Waals forces, and the like.

The term "crystal face" refers to the top or outer layer of active catalyst atoms within a catalyst crystal. The terms "crystal face exposure" and "crystal face exposition" refer to the specific arrangement of catalyst atoms within a particular crystal face (e.g, low index crystal face exposures (100), (110), and (111)).

The terms "controlled phase exposition" or "controlled face exposure" are used herein to refer to the situation where a catalytic crystal or particle has a top or outer layer of catalyst atoms in a desired coordination structure.

The term "coordination number of 2" refers to a crystal face exposure, whether low or high index, in which the active catalyst atoms on the top or outer layer are arranged so that each atom, except the terminal atoms in a given row, is coordinated with only 2 other surface atoms. The terminal atoms of each row will, of course, be coordinated with only 1 other surface catalyst atom, yet are considered to have a "coordination number of 2" for purposes of determining the percentage of top or outer layer catalyst atoms that have a nearest neighbor coordination number of 2. In the case of catalyst particles that are not really crystals, the active catalyst atoms in top or outer layer may or may not actually emulate a true crystal face.

II. Reforming Catalysts

The reforming catalysts of the present invention include (i) a support material, (ii) a halogen promoter, and (iii) a plurality of nanocatalyst particles.

A. Supports and Support Materials

The nanocatalyst particles are formed on or applied to a solid support material. Any solid support suitable for use under reforming conditions can be used as a support for the nanocatalyst particles of the present invention.

These supports may be in a variety of physical forms. They may be either porous or non-porous. They may be 3-dimensional structures such as a powder, granule, tablet, extrudates, or other 3-dimensional structure. Supports may also be in the form of 2-dimensional structures such as films, membranes, coatings, or other mainly 2-dimensional structures. It is even conceivable for the support to be a 1-dimensional structure, such as ultra-thin fibers and filaments.

In an exemplary embodiment, the support is a porous inorganic material. These include, but are not limited to, alumina, silica, silica gel, titania, kieselguhr, diatomaceous earth, bentonite, clay, zirconia, magnesia, as well as the oxides of various other metals, alone or in combination. They also include the class of porous solids collectively known as zeolites, natural or synthetic, which have ordered porous structures.

B. Halogen Promoter

A halide is incorporated into the catalyst as a promoter. The preferred halide promoter is chloride. The halogen promoter is included in an amount effective for promoting reforming. Those skilled in the art will recognize that the effective amount of halogen promoter can depend on the particular support being used, the type of metals in the nanocatalyst particles, and/or the process conditions for performing the reforming reactions. Typically reforming catalysts used under typical conditions, include a halide in an amount of greater than 1% of the total catalyst weight.

The halogen promoter can be impregnated into the support or otherwise deposited on the catalyst and/or support using any known techniques. In one embodiment, the halogen promoter is dissolved in a solvent and soaked into the support.

The solvent is then removed by drying to leave the promoter on the support material in the desired wt %. For purposes of the invention, the wt % of promoter is measured according to the total dry weight of the reforming catalyst, which includes the support and the nanocatalyst particles.

The halogen promoter can be added to the support prior to supporting the nanocatalyst particles thereon or after the nanocatalyst particles have been supported. In a preferred embodiment, the halogen promoter is applied to the support prior to forming or depositing the nanocatalyst particles on the support thereby facilitating the application of the halogen promoter. Support materials with suitable loadings of halogen promoter are also commercially available.

C. Nanocatalyst Particles

The nanocatalyst particles are nanometer-sized particles of catalytically active metals (e.g., platinum and rhenium). Pluralities of nanocatalyst particles are deposited on the support material. The nanocatalyst particles have a diameter of less than about 100 nm, more preferably less than about 50 nm, and most preferably less than about 10 nm. The nanocatalyst particles are preferably substantially evenly dispersed on the surface of the support material.

The nanocatalyst particles have a controlled crystal face exposure (e.g. a (110) crystal face). As discussed more fully below with regard to the method of making the nanocatalyst particles, the coordination structure is controlled using an organic control agent. The controlled coordination structure of the present invention gives the nanocatalyst particles particular catalytic reactivity and/or selectivity. For example, it has been found the catalysts with the (110) crystal structure have improved $C_{5+}$ hydrocarbon production during reforming.

The controlled coordination structures of the present invention may include linear configurations, such as the FCC (110) face or a zigzagged configuration, such as the HCP (120) face. The controlled coordination structures of the present invention also includes several families of low-index crystal faces which have been found to have suitable coordination structures and are useful structures for the catalysts of this invention. Examples include:

(a) the (110) face of the FCC (face-centered cubic) lattice, (b) the (221), (331) and (332) crystal faces of the FCC lattice;

(c) the (110) crystal face of the HCP (hexagonal closed packed) lattice, including (220), (330), etc.

(d) the (101) crystal face of the HCP lattice, including (202), (303), etc.

(e) the (122) crystal face of the HCP lattice;

(f) the (120) crystal face of the HCP lattice;

(g) the (122) crystal face of the BCC (body-centered cubic) lattice; and (h) the (112) and (123) crystal face of the BCC lattice.

In all of the above crystal face designations, it will be understood by those skilled in the art that each named crystal face has many alternate Miller index designations, each of which are equivalent to those listed above. All of the unnamed but equivalent crystal face designations should be understood to be included within the scope of this invention. For example, in the FCC and BCC crystal lattices, all three coordinate directions are equivalent. In this example, the (110) crystal face is identical to the (101) and the (011) crystal faces. For the HCP lattice, only the first two coordinates are equivalent. For example, the (101) and the (011) crystal faces are identical, while the (110) crystal face is distinct.

Theoretically, the term "coordination number of 2" may include catalytically active atoms in any arrangement so long as the catalyst atoms in the top or outer layer have a nearest neighbor coordination with only 2 surface catalyst atoms. Note that for purposes of this invention, the nearest neighbor coordination number does not include coordination with atoms in underlying layers of the crystal lattice.

According to one embodiment, at least about 50% of the catalyst atoms in the top or outer layer of the nanocatalyst particles will advantageously have a coordination number of 2. Preferably, at least about 60% of the catalyst atoms in the top or outer layer will have a coordination number of 2, more preferably at least about 70% of the catalyst atoms in the top or outer layer, more especially preferably at least about 80% of the catalyst atoms in the top or outer layer, and most preferably at least about 90% of the catalyst atoms in the top or outer layer will have a coordination number of 2. Reaction selectivity would be expected to be even further increased where at least about 95% or even at least about 100% of the active catalyst atoms in the top or outer layer have a coordination number of 2.

The nanoparticles can be deposited in a wide range of loadings on the support material. The loading can range from 0.01% to 90% by weight of the total weight of the supported nanoparticles. The preferred loading is typically from about 0.02 wt % to about 10 wt %, more preferably in a range from about 0.05 wt % to about 2.0 wt %.

The catalytic materials, control agents, and other components which may be selected to form nanocatalyst particles according to the present invention will now be discussed in detail.

III. Components Used to Make Nanocatalyst Precursor Compositions and Nanocatalyst Particles The nanocatalyst particles are generally manufactured from a plurality of catalyst atoms, a control agent, and a solvent or carrier. In addition to these components, the support material can also be used to influence particle formation.

A. Catalyst Atoms

The catalyst atoms that form the catalyst nanoparticles of the present invention can include any metal, or combination of one or more metals or other elements, that exhibit catalytic reforming activity. Examples of useful catalyst atoms include one or more noble metals, which include platinum, palladium, iridium, gold, osmium, ruthenium, rhodium, and rhenium. Examples of other catalyst atoms include one or more base transition metals, rare earth metals, alkaline earth metals, alkali metals, and even non metals, which can be used alone or complexed or alloyed with other catalyst materials.

Platinum (Pt) is particularly useful as the primary catalyst component in reforming catalysts. Though less preferred, palladium (Pd), rhodium (Rh) and iridium (Ir) may also be used as the primary catalyst component, or they may be used in combination with platinum as a secondary catalyst component. Tin (Sn) and rhenium (Re) can be beneficially used in combination with platinum as a secondary catalyst component, as can be various other components such as germanium (Ge), lead (Pb), arsenic (As), antimony (Sb), tungsten (W), osmium (Os), cadmium (Cd), indium (In), titanium (Ti), phosphorus (P), gallium (Ga), ruthenium (Ru), calcium (Ca), magnesium (Mg), barium (Ba), and strontium (Sr).

As described below, the catalyst atoms are added to an appropriate solvent or carrier to form a solution or suspension. Catalyst atoms can be added to a solution in elemental (e.g., metallic) form, or added in ionic form. Typically, the catalyst atoms are added in ionic form so as to more readily dissolve or disperse within the solvent or carrier. Examples of suitable ionic forms include metal halides, nitrates or other appropriate salts that are readily soluble in a solvent or carrier.

Specific examples include metal phosphates, sulfates, tungstates, acetates, citrates, and glycolates.

Metal components that are compounds themselves, such as oxides, can be added to a liquid medium in the appropriate compound form, or may be in a different chemical form that is converted to the appropriate chemical form during catalyst formation.

When added to an appropriate solvent or carrier to form an intermediate precursor composition, the catalyst atoms will typically be in ionic form so as to more readily dissolve or disperse within the solvent or carrier. In the case of a metallic catalyst, the catalyst atoms may be in the form of a metal halide, nitrate or other appropriate salt that is readily soluble in the solvent or carrier, e.g., metal phosphates, sulfates, tungstates, acetates, citrates, or glycolates.

B. Control Agents

To achieve the highly controlled specificity of catalyst formation, a control agent is selected to promote the formation of catalyst crystals or particles in which a preponderance of the top or outer layer atoms have a coordination number of 2 (e.g. a (110) crystal face). Through use of one or more specific control agents, the present invention provides a means to control the process whereby the catalytic particles are formed, ensuring that these particles predominantly expose the desired crystal face.

Control agents within the scope of the invention include a variety of polymer, oligomer or organic compounds, comprising individual molecules that mediate in the formation of the nanocatalyst particles. The control agent molecules include a plurality of functional groups disposed along a backbone that are able to form a complex between the catalyst atoms and the control agent. When catalytic particles are formed from the catalyst precursor, the structure, conformation, or other properties of the control agent cause formation of the catalyst particles to proceed in a controlled fashion, favoring the formation of controlled coordination structures.

In general, useful control agents include polymers or oligomers that can form catalyst complexes within an intermediate precursor composition that includes the control agent, catalyst atoms, an appropriate solvent or carrier, and optional promoters or support materials. The control agent is able to interact and complex with catalyst atoms dissolved or dispersed within an appropriate solvent or carrier through various mechanisms, including ionic bonding, covalent bonding, van der Waals interaction, or hydrogen bonding. In order to do this, the control agent includes one or more appropriate functional groups.

In one embodiment, the functional groups comprise a carbon atom bonded to at least one electron-rich atom that is more electronegative than the carbon atom and that is able to donate one or more electrons so as to form a bond or attraction with a catalyst atom. Preferred control agents include functional groups which have either a negative charge or one or more lone pairs of electrons that can be used to complex a catalyst atom. This allows the control agent to have a strong binding interaction with dissolved catalyst atoms, which are preferably in the form of positively charged ions in solution.

In one embodiment, the functional groups of the control agent comprise carboxyl groups along the backbone of the control agent molecules, either alone or in combination with other types of functional groups. In other embodiments, the functional groups may include one or more of a hydroxyl, a carboxyl, a carbonyl, an amide, an amine, a nitrogen having a lone pair of electrons, a thiol, a sulfonic acid, a sulfonyl halide, an acyl halide, and combinations of these. The functional group can also be a derivative of one of the foregoing. Derivatives include, for example, any of the foregoing functional groups that have been protenated or deprotenated.

Control agents according to the invention are advantageously organic polymers, oligomers or compounds; however, the control agent may be an inorganic compound (e.g., silicon-based). The control agent may be a natural or synthetic compound.

Preferred control agents include a variety of oligomers and polymers. In the case where the control agent is an oligomer or polymer, the molecular weight, measured in number average, is preferably in a range from about 300 to about 15,000 Daltons, more preferably in a range of about 600 to about 6000 Daltons. However, it is recognized that even high molecular weight polymers, i.e., greater than 15,000, can be used as the control agent if they are readily soluble in solvents, carriers or vehicles compatible with the catalyst atoms and able to form an organometallic complex.

The molecular weight may be selected to yield a control agent polymer, oligomer or molecule having a desired number of functional groups. In general, the number of functional groups may range from 4 to 200, preferably from about 8 to about 80 functional groups, and more preferably from about 10 to about 20 functional groups. In many cases, the number of functional groups within a polymer or oligomer at least approximately corresponds to the number of repeating units. As stated elsewhere, it may be possible to reduce or minimize branching by selecting a control polymer or oligomer having fewer repeating units, e.g, fewer than 20.

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

It has been found that the tendency to form catalyst particles having a coordination number of 2 on the surface is related to the percentage of straight-chained control agent molecules relative to branched molecules. Increasing the concentration of straight-chained molecules increases the likelihood of forming catalyst crystals or particles that have a coordination number of 2 on the top or outer layer of catalyst atoms. This, in turn, increases the specificity of the desired catalytic reaction.

The term "straight-chained" denotes a polymer, oligomer, or organic compound that includes a backbone that does not have any branch points. Thus, it is in reference to the backbone that determines whether a particular control agent molecule is straight-chained or not. If the backbone of a control agent molecule is linear without any branch points, the molecule is "straight-chained". If the backbone includes branch points such that the backbone is not linear but is branched, the molecule is "branched".

The term "backbone" denotes the portion of the control agent molecule to which functional groups that are useful in complexing catalyst atoms are attached. Backbones that include stray groups or chains to which no complexing functional groups are attached may therefore still be considered to be straight-chained. Thus, it may be more precise to determine whether a particular polymer, oligomer or organic compound is straight-chained or branched by determining the arrangement of functional groups along the backbone rather than merely determining whether the backbone includes branch points.

In view of the foregoing, typical control agents according to the invention are those in which at least about 50% of the control agent molecules are straight-chained. Preferably, at least about 60% of the control agent molecules are straight-chained, more preferably at least about 75% of the control agent molecules are straight-chained, even more preferably at least about 90% of the control agent molecules are straight-chained, and most preferably, at least about 95% of the control agent molecules are straight-chained. The tendency of the control agent to yield catalyst particles in which the top or outer layer of catalyst atoms have a coordination number of 2 is maximized where about 100% of the control agent molecules are straight-chained.

As a corollary to the foregoing, the control agent generally includes less than about 50% branched molecules, preferably less than about 40% branched molecules, more preferably less than about 25% branched molecules, even more preferably less than about 10% branched molecules, and most preferably less than about 5% branched molecules. The tendency of the control agent to yield catalyst particles in which the top or outer layer of catalyst atoms have a coordination number of 2 is maximized where about 0% of the molecules are branched.

In some cases, the tendency of a polymer, oligomer or organic molecule to be branched decreases with decreasing molecular weight, more specifically, with a decreased number of repeating units. Thus, reducing the molecular weight, or more precisely the number of repeating units, of a polymer, oligomer or organic molecule increases its tendency to be straight-chained. An example of a control polymer or oligomer that is more straight-chained with reduced molecular weight (i.e., fewer repeating units) is polyacrylic acid. Decreasing the molecular weight of polyacrylic acid decreases the number of repeating units, which, in turn statistically reduces the likelihood that a particular polyacrylic acid polymer or oligomer molecule will be branched.

For example, polyacrylic acid having a molecular weight of 1200, which has approximately 16 repeating units and yields catalyst particles having surface diameter of about 3-5 nm, is believed to have minimal branching. Based on current data, it is believed that at least about 80-90% of the molecules comprising polyacrylic acid having a molecular weight of 1200 are straight-chained. This is consistent with teachings relating to polymer branching found within Hiemenz, Polymer Chemistry: The Basic Concepts (1984), p. 394, which states that, for high conversions of polyethylene, "side chains may occur as often as once every 15 backbone repeat units on the average." Thus, at least with respect to polyethylene and similar polymers, oligomers having fewer than 15 units might be expected to be entirely straight-chained with no branch points. Hence, polyacrylic acid oligomers of 16 units would be expected to have only small incidence of branching, if any, particularly if reaction conditions are more carefully controlled to reduce the incidence of branching.

Once it is understood that increasing the concentration of straight-chained control agent molecules increases the likelihood of forming a catalyst particle in which the top or outer layer of catalyst atoms have a coordination number of 2, one of skill in the art will be able to select an appropriate control agent having an appropriate concentration of straight-chained versus branched control agent molecules. Thus, even larger molecular weight polymers may be carefully engineered to have straight chains and thus may have usefulness in the compositions and methods of the present invention. Most of the structural aspects of the catalytic particles such as their size, shape, formation, and dispersion can be designed based on selecting one or more control agents having a particular size and/or percentage of straight molecules versus branched molecules.

In addition to the characteristics of the control agent, a second factor which can control the selective formation of the desired controlled coordination structures of the invention is the molar ratio of the control agent to the catalyst atoms in the intermediate precursor composition. It is within the scope of the invention to include a molar ratio of control agent molecules to catalyst atoms in a range of about 1:0.1 to about 1:10. Preferably, the molar ratio of control agent molecules to catalyst atoms is in a range of about 1:0.2 to about 1:5.

In some cases, a more useful measurement is the molar ratio between control agent functional groups and catalyst atoms. For example, in the case of a divalent catalyst metal ion, such as $Pd^{+2}$, two molar equivalents of a monovalent functional group, such as carboxylate ion, would be necessary to provide the theoretical stoichiometric ratio. It may be desirable to provide an excess of control agent functional groups to (1) ensure that all or substantially all of the catalyst atoms are complexed, (2) bond the complexed catalyst atoms to the support, and (3) help keep the catalyst particles segregated so that they do not clump or agglomerate together. In general, it will be preferable to include a molar ratio of control agent functional groups to catalyst atoms in a range of about 0.5:1 to about 100:1, more preferably in a range of about 1:1 to about 50:1, and most preferably in a range of about 3:1 to about 30:1.

It is believed that the foregoing ratios play a factor because the number of control agent molecules that surround each catalyst atom determines the rate and orientation in which the catalyst particles are formed. It should be noted that the most preferred ratio of control agent to catalyst atoms will depend on the type of control agent used, the type of catalyst atoms used, and the molecular weight of the control agent. For control agents with higher molecular weights, a lower ratio of control agent to catalytic component is generally preferred, compared to cases where control agents have lower molecular weights. It is believed that this derives from the fact that control agents will often have multiple points of interaction and complex formation with dissolved catalyst components. Therefore, a higher molecular weight control agent with more functional groups along the backbone of the control agent molecules can complex with more catalyst atoms, and a lower molar ratio of control agent to catalyst component is preferred. The converse is true for a control agent with a lower molecular weight, where a higher molar ratio of control agent to catalyst component will therefore be preferred.

The support material can also be used to influence or control the coordination structure of the nanocatalyst particles. Free functional groups on the control agent can bond or interact with surface functional groups on the support during nanocatalyst formation. This interaction can influence the size and formation of the nanocatalyst particles.

In another embodiment, the control agent can be reacted with the support material before it is reacted with the catalyst atoms. In this embodiment, the bonding with the support influences the arrangement of the catalyst atoms during particle formation, thereby controlling or influencing the coordination structure that is formed.

The interaction between the control agent and the support can also influence the dispersion of the nanocatalyst particles. The catalyst atoms tend to be more evenly dispersed on the surface of the support when bonded to the control agent. The particles resulting from the coalescing of the catalyst atoms are also uniformly dispersed because the particles will form in the most thermodynamically stable formations. This results in a more active catalyst since uniformly dispersing the catalytic particles allows more reactive sites to be exposed.

Finally, depending on how the supported catalyst is formed, another aspect of the control agent is that it may act to anchor the catalyst particles to the support. That is, during and after formation of the catalyst particles, the control agent may act as an anchoring agent to secure the particle to the substrate material. Preferably, the substrate has a plurality of hydroxyl or other functional groups on the surface thereof which are able to chemically bond to one or more functional groups of the control agent, such as by a condensation reaction. One or more additional functional groups of the control agent are also bonded to one or more atoms within the catalyst particle, thereby anchoring the catalyst particle to the substrate. Chemically bonding the catalyst particle to the substrate surface through the control agent helps to keep the catalyst active over time by reducing the tendency of the catalyst particles to agglomerate.

C. Solvents and Carriers

A solvent or carrier can be used as a vehicle for the combining of the catalyst atoms (typically in the form of an ionic salt) and/or the control agent. The solvent used to make the inventive precursor compositions can be an organic solvent, water or a combination thereof. Organic solvents that can be used include alcohols, ethers, glycols, ketones, aldehydes, nitrites, and the like.

Preferred solvents are liquids with sufficient polarity to dissolve the metal salts. These preferred solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

Other chemical modifiers may also be included in the liquid mixture. For example, acids or bases may be added to adjust the pH of the mixture. Surfactants may be added to adjust the surface tension of the mixture and/or to stabilize the nanoparticles.

The solvent for the nanoparticle components may be a neat solvent, but it is preferable to use an acidic solution, as acids aid in the dissolution of the nanoparticle components. The solution may be acidified with any suitable acid, including organic and inorganic acids. Preferred acids are mineral acids such as sulfuric, phosphoric, hydrochloric, and the like, or combinations thereof. While it is possible to use an acid in a wide range of concentrations, relatively dilute solutions generally accomplish the desired solubility enhancement. Moreover, concentrated acid solutions may present added hazard and expense. Thus, dilute acid solutions are currently preferred.

IV. Methods of Making Nanocatalyst Particles and Supported Reforming Catalysts Exemplary methods for manufacturing nanocatalyst particles according to the invention can be broadly summarized as follows. First, one or more types of catalyst atoms and one or more types of control agent are selected. Second, the catalyst atoms (e.g., metals or other components) and the control agent are reacted or combined together to form a catalyst precursor. Third, the catalyst precursor is allowed or caused to form nanocatalyst particles. The nanocatalyst particles are then supported on a support material (unless the nanocatalyst particles were formed in the presence of the support, in which case, the particles will have already been formed or deposited on the support material).

A catalyst precursor is generally formed by first dissolving the catalyst atoms and control agent in an appropriate solvent or carrier and allowing the catalyst atoms to recombine as catalyst complexes in solution or suspension. In one embodiment, dispersed nanocatalyst particles form in the suspension. In an alternative embodiment, the control agent facilitates the formation of nanocatalyst particles when deposited on a support material in one or more subsequent steps.

The catalyst atoms can be provided in any form so as to be soluble or dispersible in the solvent or carrier that is used to form the catalyst precursor. For example, catalyst atoms can be provided as metal salts that are readily dissolvable in the solvent or carrier. It may be advantageous to use metal chlorides and nitrates, since metal chlorides and nitrates are typically more soluble than other metal salts.

Catalyst atoms can be added to the solvent or carrier singly or in combination to provide final nanocatalyst particles that comprise a mixture of various types of catalyst atoms. For example, a platinum/tin reforming catalyst can be formed by first forming a precursor solution of platinum and a precursor solution of tin and then combining the precursor solutions. In general, the composition of the final nanocatalyst particles will be determined by the types of catalyst atoms added to the precursor solution. Therefore, control of the amounts of metal salts added to the precursor solution provides a convenient method to control the relative concentrations of different types of catalyst atoms in the final nanocatalyst particles.

The control agent is added to the solvent or carrier in a manner so as to facilitate association of the control agent with the catalyst atoms in order to form the catalyst precursor. Some control agents may themselves be soluble in the solvent or carrier. In the case of control agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a metal-polyacrylate complex that may be soluble or which may form a suspension within the solvent or carrier.

One aspect of the invention is that very small nanocatalyst particles can be controllably formed. It is believed that the relative amounts (or ratio) of control agent to catalyst atoms may play a factor in determining the size of the resulting catalyst nanoparticles. In general, providing a stoichiometric excess of control agent helps reduce particle agglomeration, thereby also generally reducing the size of the nanoparticles.

The catalyst precursor is then impregnated into or otherwise applied to a support material to yield an intermediate catalyst composition. In one embodiment, the catalyst precursor solution or suspension is physically contacted with a solid support.

Depending on the physical form of the solid support, the process of contacting or applying the catalyst precursor to the support may be accomplished by a variety of methods. For example, the support may be submerged or dipped into a solution or suspension comprising a solvent or carrier and the catalyst precursor. Alternatively, the solution or suspension may be sprayed, poured, painted, or otherwise applied to the support, such as by incipient wetness impregnation. Thereafter, the solvent or carrier is removed, optionally in connection with a reaction step that causes the control agent to become chemically bonded or adhered to the support. Either way, the process yields a supported catalyst or intermediate supported catalyst composition.

According to one embodiment, the intermediate catalyst composition is heat treated to further activate or prepare the supported catalyst atoms or particles for use in the catalytic reforming of naphtha for octane number enhancement and/or BTX formation. It has been found that, in some cases, subjecting the nanocatalyst particles to a heat treatment process before using the reforming catalyst causes the catalyst to be more active initially. In one embodiment, the heat treatment is performed to volatilize unwanted molecules from the nanocatalyst particles. Heat treating can also be performed to increase the anchoring of the nanocatalyst particles to the support material. For example, in a naphtha reforming catalyst, progressively heating to 500° C. can improve the bonding between the nanocatalyst particles and a support material such as alumina or silica. Heat treatment can cause initial formation of nanocatalyst particles from individual complexed atoms in the case where nanoparticles are not formed in suspension prior to applying the catalyst precursor to the support material.

In an exemplary embodiment, the heat treatment process is carried out in an inert or oxidizing environment and with the catalyst atoms at least initially in a non-zero oxidation state. Additional details regarding heat treating in a non-zero oxidation state can be found in applicant's co-pending U.S. patent application Ser. No. 11/101,241, which was previously incorporated by reference.

The heat treating process of the present invention is preferably carried out at a temperature in a range of about 50° C. to about 600° C., more preferably in a range of about 100° C. to about 500° C., and most preferably in a range of about 150° C. to about 400° C. The duration of the heat treatment process is preferably in a range of about 5 minutes to about 24 hours, more preferably in a range of about 30 minutes to about 12 hours, and most preferably in a range of about 1 hour to about 6 hours. A preferred inert environment for performing the heat treating step includes $N_2$.

If desired, the catalyst nanoparticles can be reduced prior to using the reforming catalyst by using a reducing procedure (e.g., hydrogenation). Hydrogen is one preferred reducing agent. Instead of, or in addition to, using hydrogen as the reducing agent, a variety of other reducing agents may be used, including but not limited to, lithium aluminum hydride, sodium hydride, sodium borohydride, sodium bisulfite, sodium thiosulfate, hydroquinone, methanol, aldehydes, carbon monoxide, ammonia, and the like. The reduction process may be conducted at a temperature between 20° C. and 600° C. In an exemplary embodiment, the catalyst nanoparticles are partially reduced to a non-zero oxidation state before calcining.

Finally the reforming catalyst can be further processed into a finished product of size and shape suitable for a specific reactor or process configuration. For example, a powder may be processed by, among other methods, extrusion, pelletizing, or spray drying.

V. Methods of Reforming Hydrocarbons

Reforming catalysts according to the invention can be used in reforming hydrocarbons such as naphtha. Reforming catalysts can be used in dehydrogenation of naphthenes to produce aromatics, isomerization of linear paraffins to form branched paraffins or iso-paraffins, and dehydrocyclization of paraffins to form aromatics, among other reactions. Reforming catalysts can be used to enhance octane number for fuel blending and/or in BTX reactions to yield benzene, toluene, xylenes, ethyl benzene, and other aromatic compounds.

The reforming catalysts according to the invention are superior to reforming catalysts known in the art because the catalyst of the present invention show improved octane number gain and improved $C_{5+}$ production of hydrocarbons when used in a reforming reaction.

The reforming process is typically carried out in a reactor. Three suitable reactor configurations for reactions such as naphtha catalytic reforming include: a) the semi-regenerative process, where the catalyst is regenerated every 6 to 24 months, and requires that the reactor be shut down during regeneration; b) the cyclic process where a spare reactor is brought online while another is taken offline for catalyst regeneration; and c) the continuous catalyst regeneration (CCR) process, where the catalyst continuously circulates from the top to the bottom of the reforming reactor and is then fed to an external regeneration unit for reactivation and then sent to the top of the reactor.

Typically, the reforming catalyst is first loaded into the reactor and subjected to a reductive treatment. This treatment usually includes heating the catalyst to a high temperature (400° C.-525° C.) in a pure hydrogen environment. Naphtha is then continuously fed into the reactor with continuously flowing hydrogen. Typical hydrogen to hydrocarbon molar ratios are between 3 and 8.

Reaction conditions are chosen as a compromise among maximizing octane gain, minimizing losses to light gases, and extending catalyst lifetime. Catalytic naphtha reforming is performed in a hydrogen atmosphere to facilitate the hydrogenation of coke precursors, thus minimizing catalyst deactivation and equipment fouling. At the same time, higher partial pressures of hydrogen tend to inhibit dehydrogenation reactions. Total operating pressures range between about 300 kPa to about 3.5 MPa. With respect to temperature, higher values favor both higher octane numbers in the reformate and hydrocracking producing light gases. Typical operating temperatures are between about 460° C. and about 525° C.

VI. EXAMPLES

The following exemplary procedures where used to prepare reforming catalysts according to the present invention and to test their ability to improve the octane number of a naphtha feed stock.

Comparative Example 1

Commercial Catalyst

Example 1 is a commercial catalyst used as a benchmark. The formulation according to the manufacturer was 0.25% wt Pt, 0.40% wt Re, and 1.0% wt Cl, supported on 1/16" γ-alumina extrudates.

Example 2

Example 2 describes a method of manufacturing a Pt—Re reforming catalyst according to the present invention. 12.11 g of an aqueous $HReO_4$ solution containing 0.01321 g Re/ml solution was mixed with 7.13 g of an aqueous $H_2PtCl_6$ solution containing 0.01402 g Pt/ml solution and with 4.4 g of 37% HCl. Water (200.0 g) was added in, and stirred, to produce liquid A.

3.66 g of 45% polyacrylic acid sodium salt solution was diluted to 230 g, and added to liquid A while stirring. The mixture was then purged with $N_2$ flowing at 100 ml/min for 1 hour, and then treated with $H_2$ flowing at 100 ml/min for 20 minutes. It was then sealed and stirred overnight, thereby producing liquid B.

39.75 g of $Al_2O_3$ support (1/16" γ-alumina extrudates) were vacuumed for ½ hour. About 80 ml of methanol was added and the support was soaked for ½ hour. Excess methanol was then removed. Liquid B was then added to the support in a rotating vessel. The vessel was rotated under an IR lamp until the support was dry. The resulting sample was then transferred to an oven operating at about 85° C. and dried overnight. After drying, the supported catalyst was calcined under flowing $N_2$ as follows:

(1) temperature was raised from ambient to 120° C. at 3° C. per minute, (2) 2-hour holding period at 120° C., (3) temperature was raised from 120° C. to 300° C. at 3° C. per minute, (4) 2-hour holding period at 300° C., (5) temperature was raised from 300° C. to 500° C. at 1° C. per minute, (6) 2-hour holding period at 500° C.

The sample was then taken out of the furnace, and washed with water 5 times using 200 ml of water each time. The sample was then placed in a drying oven and dried at 85° C. for 6 hours to yield the final catalyst.

Example 3

Example 3 describes a method of manufacturing a Pt—Re reforming catalyst according to the present invention. 20.98 g of an aqueous $HReO_4$ solution containing 0.01150 g Re/ml solution was mixed with 14.64 g of an aqueous $H_2PtCl_6$ solution containing 0.0103 g Pt/ml solution, and with 4.0 g of 37% HCl. Water (30.0 g) was added to this mixture and stirred to produce liquid A.

5.54 g of 45% polyacrylic acid sodium salt solution was diluted to 70 g, and added to liquid A while stirring. The mixture was then purged with $N_2$ flowing at 100 ml/min for 1 hour and then treated with $H_2$ flowing at 100 ml/min for 20 minutes. It was then sealed and stirred overnight thereby producing liquid B.

60.0 g of $Al_2O_3$ support (1/16" γ-alumina extrudates) was vacuumed for ½ hour. About 80 ml of methanol was then added and the support was soaked for ½ hour. Excess methanol was then removed. Liquid B was then added to the support in a rotating vessel. The vessel was rotated under an IR lamp until the support was dry. The resulting sample was then transferred to an oven and dried at about 85° C. overnight. After drying, the final catalyst was calcined under flowing $N_2$ using the same 6 steps as in Example 2.

The sample was then taken out of the furnace, and washed with water 5 times, using 200 ml of water each time. The sample was then placed in a drying oven and dried at 85° C. overnight.

The performance of Examples 1-3 in a reforming process are shown in Table 1 below.

TABLE 1

| | Temperature | | | | | | | | |
|---|---|---|---|---|---|---|---|---|---|
| | 930° F. | | | 955° F. | | | 975° F. | | |
| | Catalyst | | | | | | | | |
| | RON | $C_{5+}$ (wt %) | octane-bbl | RON | $C_{5+}$ (wt %) | octane-bbl | RON | $C_{5+}$ (wt %) | octane-bbl |
| Example 1 | 92.7 | 83.7 | 73.5 | 97.9 | 79.8 | 72.7 | 99.5 | 76.7 | 70.2 |
| Example 2 | 92.2 | 89.3 | 78.3 | — | — | — | — | — | — |
| Example 3 | 93.4 | 89.3 | 79 | 98.5 | 85.2 | 77.9 | 100.5 | 82.6 | 76.1 |

The main goal of the reforming process is to improve the octane number of naphtha feedstocks to make the feedstocks suitable for blending in gasoline, while at the same time maximizing the amount of liquid products ($C_{5+}$ and heavier) that can be used as gasoline. The formation of undesirable light gases ($C_1$-$C_4$) from the original naphtha is largely the result of hydrocracking, which is one of several simultaneous reactions taking place in the reforming process. Thus, the key performance measure of a reforming catalyst combines its octane number enhancement with the amount of $C_{5+}$ in the final product. This is usually referred to as octane-barrel (octane-bbl) number.

As seen in table 1, the octane number (RON) of the reformate is relatively similar in Examples 1-3. Examples 2 and 3, which were catalyst manufactured according to the present invention, show a clear advantage over the commercial catalyst of Example 1 when comparing octane-bbl values. It is believed that the substantial improvement in $C_{5+}$ product weight obtained in Examples 2 and 3 is due, at least in part, to the controlled coordination structure of the catalyst of examples 2 and 3. The lower formation of light gases is likely due to less hydrocracking in examples 2 and 3, resulting from improved nanoparticle surface geometry. This desired geometry helps minimize unwanted reactions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A reforming catalyst having a controlled coordination structure and improved $C_{5+}$ production for upgrading liquid fuels to higher octane fuels, the catalyst comprising, a support material selected from the group consisting of alumina, silica, silica gel, titania, and kieselghur, the support material being in the form of a granule, tablet or extrudate, the support material having a surface;

a plurality of nano catalyst particles disposed on the surface of the support material and having a particle size of less than about 50 nm, the nanocatalyst particles comprising platinum as a primary catalyst component and one or more of tin or rhenium as a secondary catalyst component, the catalyst atoms being arranged so that at least about 50% of the catalyst atoms on a top or outer surface layer of the nanocatalyst particles have a nearest neighbor coordination number of 2; and a control agent comprising a plurality of straight-chained polymeric or oligomeric molecules that bond the nanocatalyst particles to the surface of the support material, the control agent at least partially contributing to the catalyst atoms being arranged so that at least about 50% of the top or outer surface layer of the catalyst atoms having the nearest neighbor coordination number of 2.

2. A reforming catalyst as in claim 1, in which the at least about 50% of the catalyst atoms on the top or outer surface layer of the nanocatalyst particles have a (110) crystal structure.

3. A reforming catalyst as in claim 1, further comprising a halogen promoter in an amount effective for promoting reforming reactions.

4. A reforming catalyst as in claim 1, in which the nanocatalyst particles have a size less than about 10 nm.

5. A reforming catalyst as in claim 1, in which at least about 75% of the catalyst atoms on the top or outer surface layer of nanocatalyst particles have a nearest neighbor coordination number of 2.

6. A reforming catalyst as in claim 1, in which at least about 90% of the catalyst atoms on the top or outer surface layer of the nanocatalyst particles have a nearest neighbor coordination number of 2.

7. A reforming catalyst as in claim 1, in which the control agent is selected from the group consisting of polyacrylic acid, polyvinylbenzoates, polyvinyl sulfate, polyvinyl sulfonates, sulfonated styrene, polybisphenol carbonates, polybenzimidizoles, polypyridine, sulfonated polyethylene terephthalate, polyvinyl alcohol, polyethylene glycol, polypropylene glycol, derivatives thereof, and combinations thereof.

8. A reforming catalyst as in claim 1, in which the support material comprises alumina.

9. A method for manufacturing a reforming nanocatalyst having a controlled coordination structure to improve $C_{5+}$ hydrocarbon production, comprising:

(a) providing a support material comprised of alumina;

(b) preparing a catalyst precursor complex by reacting together a plurality of individual catalyst atoms and a plurality of functional groups of an organic polymer or oligomer control agent, wherein the control agent includes greater than about 50% of straight-chained molecules, wherein the plurality of individual catalyst atoms comprise first catalyst metal atoms selected from the group consisting of platinum, palladium, and rhodium, and a combination thereof and second catalyst metal atoms selected from the group consisting of tin, rhenium, iridium, germanium, lead, arsenic, antimony, tungsten, osmium, cadmium, indium, titanium, phosphorus, gallium, ruthenium, calcium, magnesium, barium, strontium, and a combination thereof, wherein the plurality of functional groups of the control agent react with the plurality of individual catalyst atoms so as to form the catalyst precursor complex in which each catalyst atom is complexed with at least one functional group of the organic polymer or oligomer control agent;

(c) allowing or causing the catalyst precursor complex to form nanocatalyst particles, exposing the catalyst precursor complex and/or nanocatalyst particles to a reducing agent, and supporting the nanocatalyst particles on the support material, the control agent bonding the nanocatalyst particles to the surface of the support material; and (d) removing at least a portion of the control agent to expose at least a portion of the catalyst atoms on top or outer surfaces of the nanocatalyst particles, thereby yielding a supported catalyst comprising a plurality of nanocatalyst particles having a particle size less than about 50 nm and in which at least about 50% of the catalyst atoms on the top or outer surfaces of the nanocatalyst particles have a nearest neighbor coordination number of 2.

10. A method as in claim 9, in which the at least about 50% of the catalyst atoms on the top or outer surfaces of the nanocatalyst particles are arranged in a (110) crystal structure.

11. A method as in claim 9, in which the organic polymer or oligomer comprises polyacrylic acid or a salt thereof.

12. A method as in claim 9, in which the organic polymer or oligomer is selected from the group consisting of polyvinylbenzoates, polyvinyl sulfate, polyvinyl sulfonates, sulfonated styrene, polybisphenol carbonates, polybenzimidizoles, polypyridine, sulfonated polyethylene terephthalate, polyvinyl alcohol, polyethylene glycol, polypropylene glycol, derivatives thereof, and combinations thereof.

13. A method as in claim 9, in which at least a portion of the functional groups are selected from the group consisting of a hydroxyl, a carboxyl, a carbonyl, an amide, an amine with a lone pair of electrons, a thiol, a sulfonic acid, a sulfonyl halide, an acyl halide, derivatives thereof and combinations thereof.

14. A method as in claim 9, in which the control agent includes from about 4 to about 200 functional groups per organic polymer or oligomer molecule.

15. A method as in claim 9, in which the nanocatalyst particles are chemically bonded to the support material by one or more organic polymer or oligomer molecules.

16. A method as in claim 9, in which (b) further comprises reacting the catalyst atoms in the form of metal ions and the polymer or oligomer in a liquid to form the catalyst precursor.

17. A method as in claim 9, further comprising heat treating the supported nanocatalyst particles after drying at a temperature in a range of about 100° C. to about 250° C. for at least about 30 minutes.

18. A method as in claim 9, in which the support material comprises at least one of silica, alumina, or titania.

19. A method as in claim 9, further comprising providing a halogen promoter impregnated or deposited on the support material, in which at least a portion of the halogen promoter is impregnated within the support prior to forming or depositing the catalyst nanoparticles on the support material.

20. A method as in claim 9, in which at least about 75% of the polymer or oligomer molecules are straight-chained.

21. A method as in claim 9, in which at least about 95% of the polymer or oligomer molecules are straight-chained.

22. A method of reforming hydrocarbons, comprising:

introducing a reforming catalyst as in claim 1 into a reactor; and introducing a hydrocarbon feedstream into the reactor under conditions suitable for catalyzing the reforming of at least a portion of the hydrocarbon feedstream to at least one of aromatic compounds or branched paraffins.

23. A method as in claim 22, in which the nanocatalyst particles have a size of less than about 50 nm.

24. A method as in claim 22, in which the nanocatalyst particles have a size of less than about 10 nm.

25. A method as in claim 22, in which at least about 75% of the first and second catalyst atoms on the top or outer surface layer of the nanocatalyst particles have a nearest neighbor coordination number of 2.

26. A method as in claim 22, in which at least about 90% of the catalyst atoms on the top or outer surface layer of the nanocatalyst particles have a nearest neighbor coordination number of 2.

27. A reforming catalyst having a controlled coordination structure to improve $C_{5+}$ hydrocarbon production manufactured according to a method comprising:

(a) providing a support material;

(b) preparing a catalyst precursor complex by reacting together a plurality of individual catalyst atoms and a plurality of functional groups of an organic polymer or oligomer control agent, wherein the control agent includes greater than about 50% of straight-chained molecules, wherein the plurality of individual catalyst atoms comprise first catalyst metal atoms comprised of platinum and second catalyst metal atoms selected from the group consisting of tin and rhenium and a combination thereof, wherein the plurality of functional groups of the control agent react with the plurality of individual catalyst atoms so as to form the catalyst precursor complex in which each catalyst atom is complexed with at least one functional group of the organic polymer or oligomer control agent;

(c) allowing or causing the catalyst precursor complex to form nanocatalyst particles, exposing the catalyst precursor complex and/or nanocatalyst particles to a reducing agent, and supporting the nanocatalyst particles on the support material, the control agent bonding the nanocatalyst particles to the surface of the support material; and (d) removing at least a portion of the control agent to expose at least a portion of the catalyst atoms on top or outer surfaces of the nanocatalyst particles, thereby yielding a supported catalyst comprising a plurality of nanocatalyst particles having a particle size less than about 50 nm and in which at least about 50% of the catalyst atoms on the top or outer surfaces of the nanocatalyst particles have a nearest neighbor coordination number of 2, the straight-chained organic polymer or oligomer at least partially contributing to the catalyst atoms being arranged so that at least about 50% of the top or outer surface layer of the first and second catalyst atoms having the nearest neighbor coordination number of 2.

28. A reforming catalyst having a controlled coordination structure and improved $C_{5+}$ production for upgrading liquid fuels to higher octane fuels, the catalyst comprising, a support material comprised of alumina, the support material being in the form of a granule, tablet or extrudate, the support material having a surface;

a plurality of nanocatalyst particles disposed on the surface of the support material and having a particle size of less than about 50 nm, the nanocatalyst particles comprising a plurality of catalyst atoms, the catalyst atoms including first catalyst metal atoms selected from the group consisting of platinum, palladium, rhodium, and combinations thereof and a plurality of second catalyst metal atoms selected from the group consisting of tin, rhenium, iridium, germanium, lead, arsenic, antimony, tungsten, osmium, cadmium, indium, titanium, phosphorus, gallium, ruthenium, calcium, magnesium, barium, strontium, and combinations thereof, the catalyst atoms being arranged so that at least about 50% of the catalyst atoms on a top or outer surface layer of the nanocatalyst particles have a nearest neighbor coordination number of 2; and a control agent comprising a plurality of straight-chained polymeric or oligomeric molecules that bond the nanocatalyst particles to the surface of the support material, the control agent at least partially contributing to the catalyst atoms being arranged so that at least about 50% of the top or outer surface layer of the catalyst atoms having the nearest neighbor coordination number of 2.

* * * * *